United States Patent
Ambroladze et al.

(10) Patent No.: US 10,169,272 B2
(45) Date of Patent: Jan. 1, 2019

(54) DATA PROCESSING APPARATUS AND METHOD

(71) Applicant: INTERNATIONAL BUSINESS MACHINES CORPORATION, Armonk, NY (US)

(72) Inventors: Ekaterina M. Ambroladze, Los Angeles, CA (US); Norbert Hagspiel, Wendlingen (DE); Sascha Junghans, Ammerbuch (DE); Matthias Klein, Boeblingen (DE); Jeorg Walter, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 413 days.

(21) Appl. No.: 14/827,636

(22) Filed: Aug. 17, 2015

(65) Prior Publication Data

US 2016/0055107 A1     Feb. 25, 2016

(30) Foreign Application Priority Data

Aug. 19, 2014    (GB) .................................. 1414711.0

(51) Int. Cl.
     *G06F 13/28*       (2006.01)
     *G06F 13/38*       (2006.01)
     (Continued)

(52) U.S. Cl.
     CPC ............ *G06F 13/28* (2013.01); *G06F 12/084* (2013.01); *G06F 12/0862* (2013.01); *G06F 2212/6028* (2013.01)

(58) Field of Classification Search
CPC ... G06F 3/00; G06F 5/00; G06F 12/00; G06F 13/00
See application file for complete search history.

(56) References Cited

U.S. PATENT DOCUMENTS 5,963,978 A * 10/1999 Feiste ................. G06F 12/0811
                                                                     710/39
7,886,114 B2     2/2011   Gotoh
(Continued)

OTHER PUBLICATIONS

Rafique et al., "DMA-Based Prefetching for I/O-Intensive Workloads on the Cell Architecture", Proceedings of the 5th Conference on Computing Frontiers, CF'08, May 5-7, 2008 (pp. 23-32).
(Continued)

*Primary Examiner* — Scott C Sun
(74) *Attorney, Agent, or Firm* — Margaret McNamara, Esq.; Kevin P. Radigan, Esq.; Heslin Rothenberg Farley & Mesiti P.C.

(57) ABSTRACT

A data processing apparatus is provided, which includes: a plurality of processor cores; a shared processor cache, the shared processor cache being connected to each of the processor cores and to a main memory; a bus controller, the bus controller being connected to the shared processor cache and performing, in response to receiving a descriptor sent by one of the processor cores, a transfer of requested data indicated by the descriptor from the shared processor cache to an input/output (I/O) device; a bus unit, the bus unit being connected to the bus controller and transferring data to/from the I/O device; wherein the shared processor cache includes means for prefetching the requested data from the shared processor cache or main memory by performing a direct memory access in response to receiving a descriptor from the one of the processor cores.

18 Claims, 3 Drawing Sheets

(51) Int. Cl.
*G06F 12/0862* (2016.01)
*G06F 12/084* (2016.01)
*G06F 3/06* (2006.01)

(56) References Cited

U.S. PATENT DOCUMENTS

| | | | |
|---|---|---|---|
| 7,975,080 B2 | 7/2011 | Auernhammer | |
| 8,028,116 B2 | 9/2011 | Kawaguchi | |
| 8,364,851 B2 | 1/2013 | Kessler et al. | |
| 8,578,069 B2 | 11/2013 | Fuhs et al. | |
| 2014/0281055 A1* | 9/2014 | Davda | G06F 12/1081 710/26 |
| 2015/0006834 A1* | 1/2015 | Dulloor | G06F 3/0604 711/162 |

OTHER PUBLICATIONS

Tang et al., "DMA Cache: Using On-Chip Storage to Architecturally Separate I/O Data from CPU Data for Improving I/O Performance", 2010 IEEE 16th International Symposium on High Performance Computer Architecture (HPCA), Jan. 9-14, 2010 (12 pages).

\* cited by examiner

DATA PROCESSING APPARATUS AND METHOD

PRIOR FOREIGN APPLICATION

This application claims priority from United Kingdom (GB) patent application number 1414711.0, filed Aug. 19, 2014, which is hereby incorporated herein by reference in its entirety.

BACKGROUND

This invention relates in general to a data processing apparatus. More particularly, the invention relates to a data processing apparatus for performing direct memory access.

To provide for high processing performance, computer system architectures generally include caches. Advanced architectures also provide for direct data transfer from the processor cache to I/O devices. As, in instances, the overall system performance in a computer system may be affected by the rate of data transfer to I/O devices, there is a general need for further improvements in this technical area.

SUMMARY

In one or more aspects, a data processing apparatus is provided herein which includes: a plurality of processor cores; a shared processor cache, the shared processor cache being connected to each of the processor cores and to a main memory; a bus controller, the bus controller being connected to the shared processor cache and performing, in response to receiving a descriptor sent by one of the processor cores, a transfer of requested data indicated by the descriptor from the shared processor cache to an input/output (I/O) device; a bus unit, the bus unit being connected to the bus controller and facilitating transferring data to or from the I/O device; and wherein the shared processor cache comprises means for prefetching the requested data from the shared processor cache or main memory by performing a direct memory access in response to receiving the descriptor from the one processor core.

In one or more other aspects, a method is provided for operating a data processing apparatus in connection with an input/output (I/O) device. The data processing apparatus includes a plurality of processor cores, a shared processor cache, a bus unit, a main memory, and a bus controller. The method includes: transmitting a descriptor from one of the processor cores to the shared processor cache in order to perform a data transfer according to the descriptor from the shared processor cache to the I/O device; receiving the descriptor by the shared processor cache; performing a prefetch of data to be transferred to the I/O device by the shared processor cache based on the received descriptor; forwarding the descriptor to the bus controller; and transferring the prefetched data from the shared processor cache to the I/O device via the bus unit by operation of the bus controller.

In one or more further aspects, a computer program product is provided for operating a data processing apparatus in connection with an input/output (I/O) device. The data processing apparatus includes a plurality of processor cores, a shared processor cache, a bus unit, a main memory, and a bus controller. The computer program product includes a computer readable storage medium having computer readable program code embodied therein, the computer readable program code is adapted to perform a method when executed, comprising: transmitting a descriptor from one of the processor cores to the shared processor cache in order to perform a data transfer according to the descriptor from the shared processor cache to the I/O device; receiving the descriptor by the shared processor cache; performing a prefetch of data to be transferred to the I/O device by the shared processor cache based on the received descriptor; forwarding the descriptor to the bus controller; and transferring the prefetched data from the shared processor cache to the I/O device via the bus unit by operation of the bus controller.

BRIEF DESCRIPTION OF THE DRAWINGS

Certain embodiments are described herein below with reference to the attached drawings, in which.

DETAILED DESCRIPTION

Figure 1:
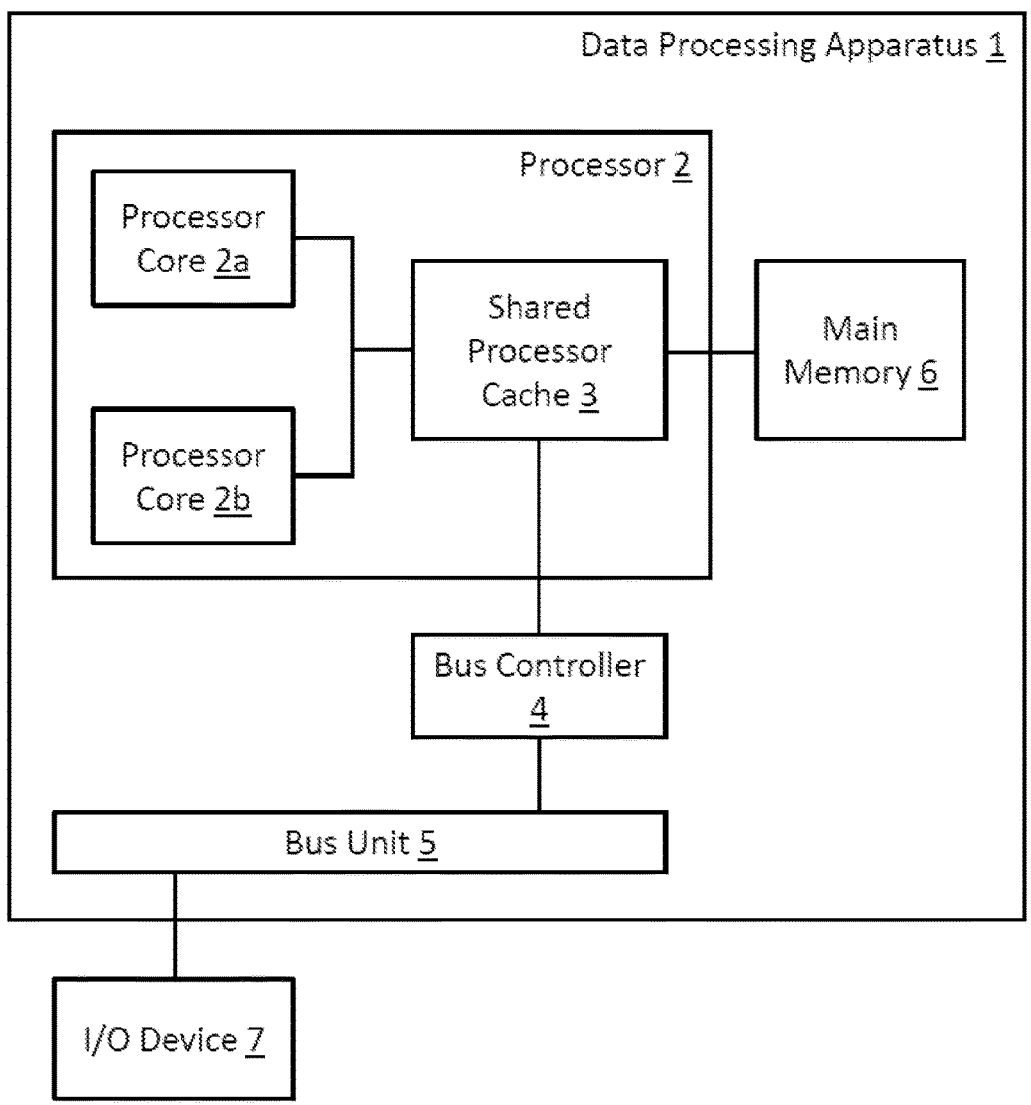
FIG. 1 schematically illustrates a data processing apparatus general architecture, in accordance with one or more aspects of the present invention.
Figure 2:
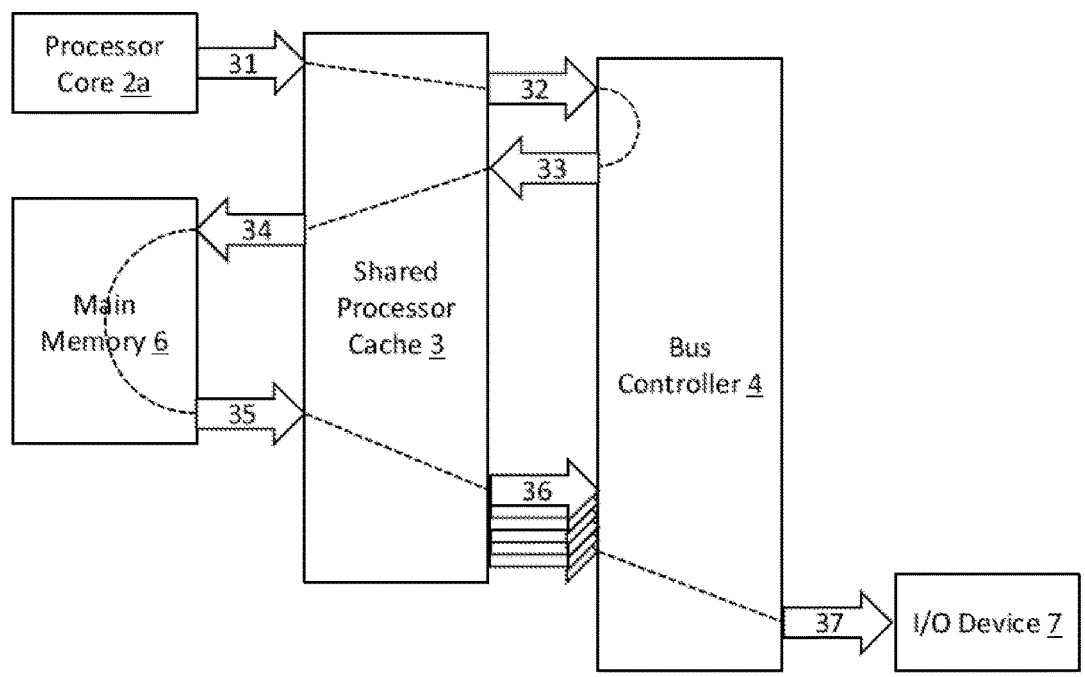
FIG. 2 schematically illustrates a method for transferring data from a processor to an I/O device using direct memory access in a data processing apparatus according to FIG. 1, in accordance with one or more aspects of the present invention.
Figure 3:
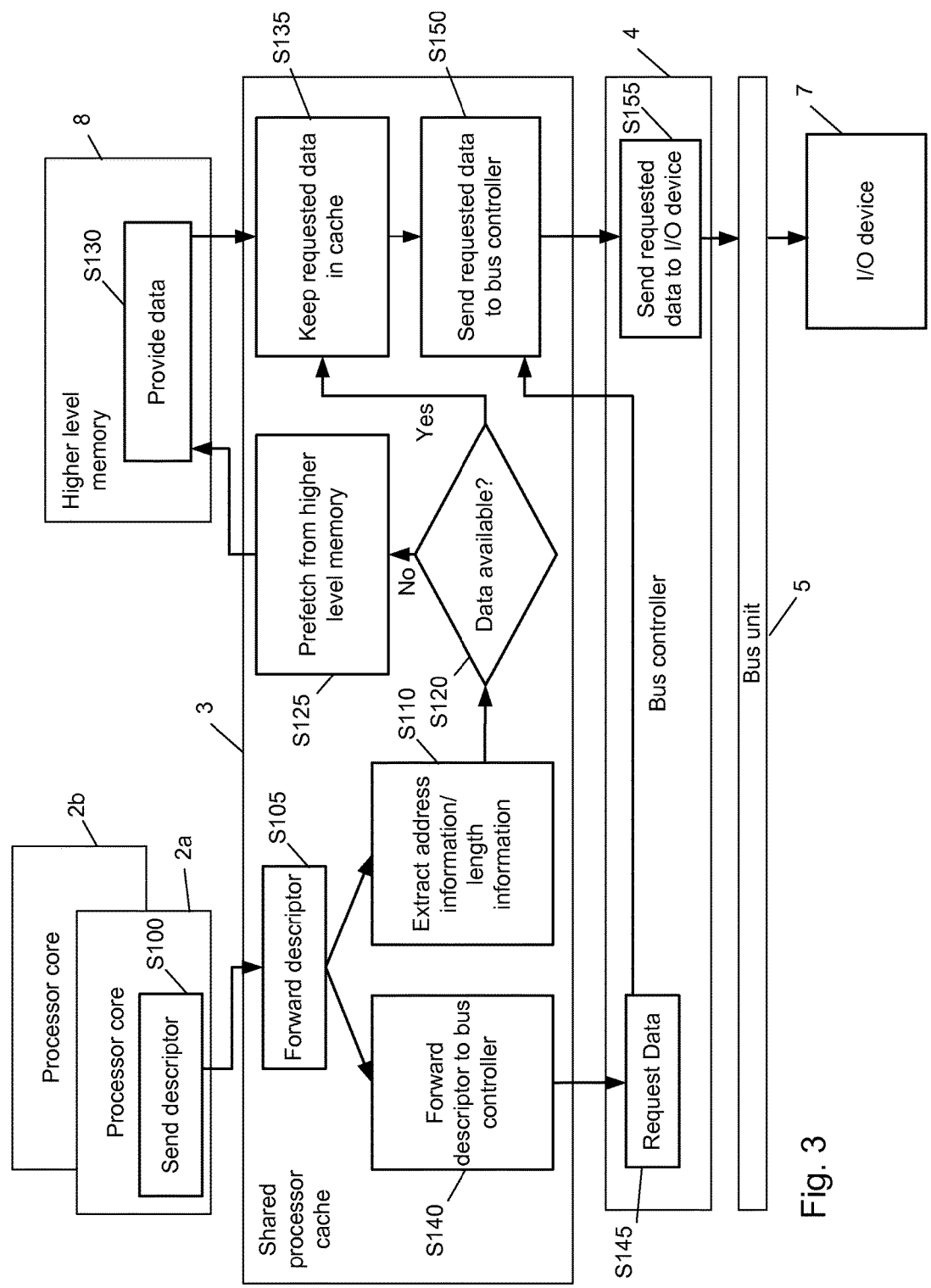
FIG. 3 schematically illustrates a method for transferring data from a processor to an I/O device using direct memory access in a data processing apparatus including a data prefetch routine, in accordance with one or more aspects of the present invention.

On the basis of the following detailed description with reference to FIGS. 1-3 it will become apparent, that the generalized direct memory access may be understood (in one or more aspects) as a processor core driven cache transparent direct memory access method. The methods described below are initiated by a processor core and driven by a bus controller rather than initiated and driven by an I/O device.

FIG. 1 schematically shows a computer system component block structure. The computer system may, for example, be part of a laptop, desktop, workstation or mainframe computer.

As shown, the computer system may comprise a data processing apparatus 1 and a separate I/O device 7. The data processing apparatus 1 itself may include a processor 2, a bus controller 4, a bus unit 5 and a main memory 6. The processor 2 may comprise a number or plurality of processor cores 2a, 2b and a shared processor cache 3. In one or more instances, the shared processor cache 3 may be implemented as an on-die cache device being connected to the processor cores which are located on the same processor die. In an example, each processor core 2a, 2b may additionally include a number of processor core caches. Such a structure corresponds to widely used multi-level cache hierarchies. In another example, the multi-level cache hierarchy may include at least three levels. According to the terms and conventions in the technical field, the level of the caches increases along with the lookup procedure performed thereon. Initially, data lookup is performed in the first level cache. If this lookup fails, the next one will be made in the second level cache and so on. In the literature, the highest level cache often is referred to as the last level cache (LLC). If the lookup performed on the last level cache fails, the respective data has to be loaded from the main memory. When read in reverse, this may be used as a definition of the last level in a multi-level cache hierarchy.

For the sake of clearness and understandability, in the exemplary drawings only a one-level cache hierarchy is shown. Further, it is assumed that the one-level cache hierarchy is implemented by means of an on-die cache device which is located on the same die as the processor cores 2a, 2b. Further, the single on-die cache device may be symmetrically connected to each of the processor cores 2a, 2b for being operable as a shared processor cache 3. Thereby, sharing of the cache 3 is enabled between the two exemplary processor cores 2a, 2b. In instances, both processor cores 2a, 2b may read and/or write data from/to the shared processor cache 3. In an example, the shared processor cache 3 may be shared entirely. Then, all data in the shared processor cache 3 can be manipulated by both processor cores 2a, 2b in the same way. This may be advantageous in applications when bandwidth in data exchange between the processor cores 2a, 2b is a critical point. In another example, the shared processor cache 3 may be partially shared only. Then, each processor core 2a, 2b will have a small portion of the space in the shared processor cache 3 exclusively assigned to. Shared operation is only provided on the remainder of the space in the shared processor cache 3. This may be advantageous in applications, when the operations performed by the processor cores 2a, 2b have very different requirements with regard to memory access bandwidth. If, for example, one processor core performs operations on a small amount of data there will occur a heavy degradation in performance when another processor core extensively accesses the physical address space in the main memory. This degradation will result from the deletion of existing cache lines in order to recover space for newly accessed physical addresses.

In one or more instances, the shared processor cache 3 may be configured to allow forwarding of data written thereto by a processor core 2a, 2b to the bus controller 4. In a more detailed example, the shared cache 3 may forward a predefined portion of written data as the result of a write operation performed by a processor core 2a, 2b. In general, the shared processor cache may be configured to provide a connection between the processor cores 2a, 2b and the bus controller 4. This will allow data forwarding via the shared cache 3 to a device connected to the bus unit 5. Further details will be explained below. The target of the data forwarding may be bus controller 4, for example. In yet another typical example, forwarding may depend on a portion of data written to the shared cache 3 by one of the processor cores 2a, 2b. In such circumstances, the data written to the shared cache 3 may be of a descriptor or reference type designating a virtual or physical address range for transfer to the target. This would correspond to a conceptual generalization of conventional direct memory access descriptors.

In an example, as shown in FIG. 1, main memory 6 may be located outside the processor 2. In an alternative example, however, the main memory may be integrated into the processor of the data processing apparatus. In another example, the access to the main memory 6 may be realized by a memory management unit. The memory management unit may be integrated on the same die as the processor. Typically, the memory management unit operates in the physical address space. In one or more examples, the memory management unit's principal function is to maintain cache coherency between the last level cache and the main memory. Cache coherency may be understood as to make the cache transparent relative to processor core read/write operations. In instances, the memory management unit may be configured to transfer data between the last level cache and the main memory. For the sake of simplification, a memory management unit is not shown in the drawings.

In an example, the bus controller 4 may serve to connect the shared processor cache 3 to the bus unit 5. In a more particular example, this connection may be established between the shared processor cache 3 and the bus controller 4 as shown in FIG. 1. In an example, the bus controller 4 may be separate from the processor 2. However, in another situation as shown in FIG. 1, the bus controller 4 may be integrated with the processor 2. In instances, the bus controller 4 may be built on the same die as the processor cores 2a, 2b and the shared processor cache 3.

In one or more instances, the bus controller 4 may be configured to perform fetch operations to an address in the main memory 6 physical address space as part of the direct memory access operation. In a more particular example, the bus controller 4 may be configured to perform the fetch operation by inclusion of the shared processor cache 3 of the processor 2. This may be advantageous to avoid performance degradation due to memory latency in situations when data is available from the shared processor cache 3. Fetch operations based on shared processor cache 3 may be performed on virtual or physical addresses.

FIG. 2 illustrates a method for operating a data processing apparatus according to one or more aspects of the present invention. The method may be advantageously performed on an apparatus as explained above with reference to FIG. 1.

The data flow scheme only shows the data processing apparatus components involved in the direct memory access operation to be explained. These components have the same reference numerals assigned as in FIG. 1. It should be noted that (by way of example) time evolution is top down, i.e. the exemplary method steps may be performed one after each other starting on the top. In the drawings, arrows are used to symbolize directed data transfer/propagation between components. However, there is no general need for control to be transferred in the same way between these components. In instances, there may be multiple threads of control running on the components.

The component block symbols have dotted lines in the interiors as an indication of data passing through, data dependency and/or causality of data input/output. The dotted lines, however, make no indication towards the details of data propagation through the respective component. In particular, the dotted lines should not be interpreted towards an unchanged data pass-through (forwarding). The dotted lines may also extend to situations when data is processed into another format or another representation by the component it passes through.

For the sake of simplification and without any restriction, it is assumed that the data transfer is initiated by the processor core 2a. Due to the symmetric design of the data processing apparatus 1 respective to the processor cores 2a, 2b and their respective connections to the shared processor cache 3, the transfer could be initiated by the processor core 2b in the same way. Moreover, for a complete understanding of the benefits resulting from the method, the data to be transferred to the I/O device 7 is assumed not being available from the shared processor cache 3 but rather needs to be fetched from the main memory 6.

In an example of the data transfer method, the processor core 2a starts the data transfer by writing a descriptor to the shared processor cache 3 in a first step 31. In an example, this descriptor may be a command code together with control data. In a further example, the command code may be a machine instruction word and the control data may be a separate 8B (bytes) of data. In another example, the 8B control data may be incorporated into the machine instruction word as, for example, address offset values are incorporated into the instruction word in indexed load/store operations on so-called load/store processor architecture.

By way of example, the descriptor may be forwarded from the shared processor cache 3 to the bus controller 4 in a subsequent step 32. In a more particular example, the descriptor may be passed through the shared processor cache 3 unchanged to the bus controller 4. In an example, the descriptor data forwarding may be carried out by a push-like operational mode of the shared cache 3. Alternatively, the forwarding may be based on a poll-like performed by the bus controller 4.

When the bus controller 4 receives the descriptor, it causes, in another step 33, the shared processor cache 3 to be filled with the payload data to be transferred to the I/O device. In an example, the payload data may be fetched from the main memory 6 if not already available in the shared processor cache 3. In another example, this payload data fetching step may use similar hardware components and functional modules as a data load of the processor core 2a "through" the transparent shared processor cache 3 when performing a data processing operation. In a more detailed example, in two steps 34, 35 an entire cache line may be transferred from the main memory 6 into the shared processor cache 3.

In one or more instances, the payload data may be stored in a main memory coherent portion of the shared cache 3. Alternatively, the payload data may be alternatively stored in an address-less (non-main memory coherent) portion of the shared processor cache 3. In this situation, data constituting part of the payload data may be extracted from the main memory 6 coherent portion of the shared processor cache 3 and placed into the address-less portion thereof. In a more detailed example, the data may be stored in a predefined (blocked) format as, for example, in an array of 16×16 B. This may be advantageous as the bus controller 4 would be able to fetch payload data always from the same portion of the shared processor cache 3. Then, sharing of the processor cache 3 between the processor cores 2a, 2b and the bus controller 4 could be advantageously limited to the address-less portion for the sake of better system performance.

Additionally, there would be no dependency between the organization of the payload data in the shared processor cache 3 and the physical address of the payload data in the physical address space.

After the payload data has been made available somewhere in shared processor cache 3 in the required format, the payload data is transferred to the bus unit 5 by operation of the bus controller 4 in a subsequent step 36. In one or more instances, this data transfer may be performed directly by the bus controller 4. In a more detailed example, the transfer may be made in a similar way as commonly known from conventional direct memory access fetch operations. If, as explained before, the payload data has been organized in the address-less portion of the shared processor cache 3 in a predefined format, the transfer may rely on that format and may, in the specific example, be executed in blocks of 16 B.

When the payload data has been made available to the bus controller 4, it may be sent down to an I/O device 7 via the bus unit 5 in a final step 37.

FIG. 3 illustrates a method for operating a data processing apparatus including a prefetch routine for prefetching requested data, in accordance with one or more aspects of the present invention. Similarly to the method described above in connection with the FIG. 2, one of the plurality of processor cores 2a, 2b sends a descriptor to the shared processor cache 3 (S100). In case, that the shared processor cache 3 comprises multiple cache devices, the descriptor may be forwarded to a certain cache device of said shared processor cache 3 (S105). For example, the descriptor may be forwarded to a cache device being in closest proximity to the bus controller 4. In other words, the shared processor cache 3 may comprise a hierarchy of cache devices and the descriptor is forwarded to the cache device arranged in lowest hierarchy level with respect to the bus controller 4.

The descriptor may, for example, comprise a header portion and an address portion. The header may comprise information regarding which command should be executed (e.g. an I/O command). The address information may be virtual or physical address information indicating where the payload data requested by the command are stored. In addition, the descriptor may comprise additional fields, for example a field comprising an indicator, said indicator specifying that the prefetch routine should be executed while processing said command. In an alternative embodiment, the shared processor cache 3 may comprise means (e.g. a state machine) being adapted to decide whether the prefetch routine has to be started based on the command type. In other words, there has to be no additional indicator within the descriptor for starting the prefetch routine, but the shared processor cache 3 may be adapted to start the prefetch routine based on the type of command, e.g. every time a command for providing data to an I/O device 7 is received at the shared processor cache 3, the shared processor cache 3 may start the prefetch routine.

The prefetch routine may initiate fetching the data requested by the command comprised within the descriptor, in the following also referred to as requested data, in parallel with forwarding the descriptor to the bus controller 4. Thereby, the performance of the data processing apparatus 1 may be significantly increased in some scenarios, because the provision of data is initiated by the shared processor cache 3 before the arrival of the respective data request transmitted by the bus controller 4 which may be done significantly later because of queuing, for example.

In order to be able to initiate said data prefetch routine, the shared processor cache 3 may extract said address information out of the descriptor (S110). The shared processor cache 3 may comprise means for extracting said address information. For example, the shared processor cache 3 may comprise a state machine for extracting said address information. Preferably, the means for extracting said address information may also be adapted to derive information regarding the length of the requested data out of the descriptor (S110). Thereby it is possible to initiate the data prefetch based on information regarding the location of storage and the length of requested data in order to gather the required payload data.

During the data prefetch routine, the shared processor cache 3 may check if the requested data are available in said shared processor cache 3 (S120). More in detail, the hierarchy level of the shared processor cache 3 may investigate, whether the requested data are available in the present cache hierarchy level. If so, the requested data are further kept within the shared processor cache 3 (S135), specifically, in the fastest hierarchy level of the shared processor cache 3.

If the requested data are not available within the shared processor cache 3, the shared processor cache 3 may initiate a further prefetch routine for prefetching the requested data from a higher level memory 8 (S125). The higher level memory 8 may be a further, higher level cache or the main memory 6. The prefetch routine may initiate a plurality of prefetch queries if the requested data are not available in the shared processor cache 3 and in further higher level caches. Finally, the requested data may be provided by the higher level memory 8 to the shared processor cache 3 (S130).

The requested data transmitted from the higher level memory 8 to the shared processor cache 3 may be stored in the shared processor cache 3 (S135). For example, data already stored in the cache may be replaced by the requested data provided by the higher level memory 8 based on a least recently used routine (LRU-routine).

After receiving the descriptor at the shared processor cache 3, said shared processor cache 3 may also forward the descriptor to the bus controller 4 (S140). The forwarding may be performed in parallel with the initiation of the data prefetch routine. More in detail, the shared processor cache 3 may on the one hand extract the address information for prefetching the data and may also forward the descriptor to the bus controller 4 in order to trigger the bus controller to perform a data transfer according to the descriptor. In one or more embodiments, the descriptor provided to the bus controller 4 may be identical with the descriptor provided by the processor core 2a. According to other embodiments, the descriptor may be modified within the shared processor cache 3.

After receiving the descriptor at the bus controller 4, the bus controller 4 may arrange a transfer of the requested data to the I/O device 7.

The bus controller 4 may have to wait a significant amount of time before the data request may be sent to further request the data from the shared processor cache 3 based on information comprised within the descriptor (S145) because of queueing caused by command ordering. In other words, there is a significant delay of handling the data request because of one or more pending tasks to be handled by the bus controller 4.

The bus controller 4 may send a data request command to the shared processor cache 3 in order to trigger a transmission of the data requested by the descriptor to the bus controller 4. Due to the prefetch routine, the requested data may have already been fetched from of the shared processor cache 3 or a higher level memory 8 when the data request information transmitted by the bus controller 4 to the shared processor cache 3 arrives at the shared processor cache 3. So, by using said prefetch routine, the latency time between sending a descriptor to the shared processor cache 3 in order to perform an I/O command and providing requested data to an I/O device 7 is significantly enhanced.

The receipt of data request information (transmitted by the bus controller 4) at the shared processor cache 3 may trigger the transmission of requested data (which has been fetched by the prefetch routine) from the shared processor cache 3 to the bus controller 4. In case that the requested data are already available at the point of time, at which the data request is received from the bus controller 4, the shared processor cache 3 may initiate the transmission of the requested data to the bus controller 4 (S150). If not, the shared processor cache 3 may transmit the requested data to the bus controller 4 after said requested data have been fetched from higher level memory (S125). Finally, the bus controller 4 may forward the requested data via the bus unit 5 to the I/O device 7 (S155).

In heavy load situations, the situation may occur that the prefetch routine fetched the requested data and said requested data were provided in the shared processor cache 3 but the data request provided by the bus controller 4 is delayed for such a long period of time that the prefetched data are not available any more. The shared processor cache 3 may implement a least recently used routine (LRU-routine) which may update the cache in order to provide the recently used data. By means of the LRU-routine, the prefetched data may be removed out of the shared processor cache 3 if the time delay between prefetching the requested data and the arrival of the data request provided by the bus controller 4 is too long. Thus, after arrival of the data request, the shared processor cache 3 may evaluate based on the data provided by the data request whether the prefetched data are still available in the cache (step 146). If so, the shared processor cache 3 may initiate the transmission of requested data to the bus controller 4 (S150). Otherwise, the data may be again fetched from higher level memory (S125).

It is apparent, that the direct memory access method as described before may be subject to limitations due to the size of the shared processor cache therein. In these cases, the method may be carried out multiple times for transferring larger amount of data.

Based upon the above, those skilled in the art will note that provided herein are embodiments of a data processing apparatus with an enhanced performance for sending data to an I/O device. Various embodiments are given in the dependent claims. If not explicitly indicated otherwise, embodiments of the invention can be freely combined with each other.

According to one or more aspects, a data processing apparatus is provided. The data processing apparatus comprises a number of processor cores and a shared processor cache, the shared processor cache being connected to each of the processor cores and to a main memory. The data processing apparatus further comprises a bus controller, the bus controller being connected to the shared processor cache and being configured, in response to receiving a descriptor sent by one of the processor cores, to perform a transfer of requested data indicated by the descriptor from the shared processor cache to an I/O device. In addition, the data processing apparatus comprises a bus unit. The bus unit is connected to the bus controller and is configured for transferring data to/from an I/O device. The shared processor cache comprises means for prefetching the requested data from the shared processor cache or main memory by performing a direct memory access in response to receiving a descriptor from one of the processor cores. In other words, the prefetching of the requested data is initiated by the shared processor cache itself without any impact of the bus controller. Thereby, the shared processor cache can start to fetch the requested data directly when the shared processor cache has received the descriptor from the processor core instead of waiting for the data request initiated by the bus controller. Thereby, the requested data will be provided faster from the shared processor cache to the bus controller once the bus controller is requesting the data from the shared processor cache.

According to one or more embodiments, the shared processor cache comprises means for extracting address information from within the descriptor. The means may be, for example, a state machine or a circuitry configured to extract the address information out of the descriptor. After address information extraction, the shared processor cache may fetch the requested data based on said address information. The extracted address information may be virtual address information or physical address information.

According to one or more further embodiments, the shared processor cache comprises means for extracting information regarding the length of requested data out of the descriptor. The length information may be indicative for the length of the data block to be prefetched. Based on said length information the amount of data to be prefetched may be determined.

According to further embodiments, the shared processor cache may be adapted to perform the direct memory access based on the extracted address information. The data prefetch may be performed without any interaction of the bus controller. By means of the direct memory access at the extracted address information, the shared processor cache may provide the requested data before the data request of the bus controller is received at the shared processor cache. Thereby the period of time for providing the requested data to the I/O device is significantly decreased.

According to one or more further embodiments, the shared processor cache may be adapted to perform the direct memory access based on the extracted address information and the extracted information regarding the length of the requested data. The extracted address information may be indicative for the first data block of the requested data and extracted length information may indicate the length of the requested data.

According to further embodiments, the shared processor cache may be configured to forward the descriptor to the bus controller. So, in parallel with the prefetch routine, the descriptor may be also forwarded to the bus controller in order to prepare the transfer of the requested data (which are—at the same time—prefetched by means of the prefetch routine) to the I/O device.

According to one or more further embodiments, the bus controller may be configured to provide data request information to the shared processor cache in order to trigger the forwarding of the prefetched requested data to the bus controller. The trigger may be initiated by the descriptor transmitted by the shared processor cache to the bus controller. The data request information may, for example, comprise the address information of the requested data in order to provide prefetched data corresponding with the data request information to the bus controller.

According to one or more further embodiments, the shared processor may be configured to initiate a prefetch of the requested data based on an indicator within the descriptor. The descriptor may be adapted to include different command types wherein only some command types may be associated with the prefetch routine. The indicator, for example an indicator bit within the header portion of the descriptor, may be checked in order to decide whether the prefetch routine should be started or not.

According to other embodiments, the shared processor cache may be configured to initiate a prefetch of the requested data based on the command type included in the descriptor. For example, the shared processor cache may have access to a look-up table or may include a state machine in order to investigate whether a prefetch routine should be started while processing a command of a certain command type. For example, the command "send data to I/O" may indicate that a prefetch routine has to be started.

According to further embodiments, the shared processor cache may be configured for loading the requested data from the main memory into the shared processor cache if the requested data is not already stored in the shared processor cache. Thereby, recently used data is stored in the cache in order to enhance the performance of the data processing apparatus.

According to one or more embodiments, the data processing apparatus has a shared processor cache which includes an integral cache device connected to multiple processor cores.

In advancement thereof, the data processing apparatus may have a shared processor cache comprising an integral on-die cache device connected to multiple processor cores located on the same processor die.

In one or more other embodiments, the data processing apparatus has a shared processor cache comprising multiple integral cache devices connected together in a network.

In advancement thereof, each of said integral cache devices may be an on-die cache device connected to a number of processor cores located on the same processor die.

In other embodiments, the data processing apparatus may have a network of several integral cache devices, a portion thereof being pairwise connected to portions of the main memory.

According to one or more embodiments, the data processing apparatus may have a bus controller being additionally configured for fetching the data according to the descriptor from the main memory into a location within the shared processor cache.

In another embodiment, the data processing apparatus may have a processor core being configured for creating the descriptor.

The aforementioned embodiments may be advantageous for achieving improvement in data transfer rate when transferring data from a processor cache and/or main memory to I/O devices. Moreover, said embodiments may provide improve the overall system performance by avoiding continuous involvement of a processor core in such data transfer.

According to one or more embodiments, the bus controller may be of the data processing apparatus a PCIe (Peripheral Component Interface Express) bus controller.

According to one or more embodiments, the data processing apparatus may have the bus controller be integrated with the processor. Such embodiments may be advantageous for achieving improvement in data transfer rate between the bus controller and the shared processor cache due to higher clock cycle rates.

According to one or more embodiments, the data processing apparatus may include at least two processor cores.

According to one or more embodiments, the data processing apparatus may have a shared processor cache being part of a multi-level cache hierarchy.

According one or more embodiments, the data processing apparatus may have a shared processor cache being a third level cache in a multi-level cache hierarchy.

According to one or more embodiments, the data processing apparatus may have a shared processor cache being the last level cache in a multi-level cache hierarchy.

According to one or more embodiments, the data processing apparatus may have a shared processor cache operating on physical memory addresses.

According to one or more embodiments, the data processing apparatus may have the processor cores, the shared processor cache and the bus controller formed on a single die. Such embodiments may be advantageous to achieve a higher level of processor integration, smaller processor structures and higher clock cycle rates in processor operation.

According to one or more other aspects, a method for operating a data processing apparatus in connection with an I/O device is provided. The data processing apparatus comprises a number of processor cores, a shared processor cache, a bus unit, a main memory and a bus controller. The method comprises: transmitting a descriptor from one of the processor cores to the shared processor cache in order to perform a data transfer according to the descriptor from the shared processor cache to the I/O device; receiving the descriptor by the shared processor cache; performing a prefetch of data to be transferred to the I/O device by the shared processor cache based on the received descriptor; forwarding the descriptor to the bus controller; and transferring the prefetched data from the shared processor cache to the I/O device via the bus unit by operation of the bus controller.

According to one or more aspects, a computer readable non-transitory storage medium comprising computer readable instructions to be executed by a processor core of a data processing apparatus is provided. The instructions cause, when executed by a processor, the processor to execute a method as indicated herein.

Note that the term "processor", as used herein, extends to an electronic device and any portion of an electronic device which is able to execute a computer program or any kind of machine executable instruction. A processor generally comprises a number of processor cores and may include a number of data and/or instruction caches.

The term "shared processor cache", as used herein, refers to any hardware configuration providing access to a cache for more than one processor core. In general, the principal purpose of a shared processor cache may be understood as providing a transparent and latency reducing connection between the processor cores and the main memory. In instances, a shared processor cache may additionally serve as a high-bandwidth connection between the processor cores and devices for controlling external ports, busses or adapters. A shared cache may be, for example, an integral or monolithic cache device providing uniform access to a number of processor cores connected thereto. In another exemplary situation, a shared processor cache may be implemented as a network of several integral cache devices. In another exemplary situation, the integral cache devices may be implemented as on-die cache devices located on a processor die. In such situation, each on-die processor cache may be additionally configured to serve as a shared cache for a number of processor cores on the same die. Effectively, there may be a hierarchy of two layers in cache sharing. The lower level on-die cache sharing will typically allow higher bandwidth in data exchange but will be necessarily limited to the processor cores located on the same die. Cache sharing across processor dies will typically yield lower bandwidth in data exchange than the on-die cache sharing. As a further improvement, a separate portion of the main memory may be connected to each on-die processor cache for avoidance of bottlenecks. This approach may be understood as shared memory multi-processor architecture having the memory sharing infrastructure on the level of caches rather than on the (lowest) level of the main memory.

The term "bus unit", as used herein, encompasses any means configured to transfer data between devices in a computer system. The term "bus" shall not be understood as limitation to a shared bus device. All kinds of point-to-point connections are intended to be included in the phrase as well. For instance, the bus unit is used for high-speed data transfer to/from a processor and therefore connects the processor to devices, which may be operated at a high speed of data transfer. In instances, the bus unit is designed to establish connection to fast I/O devices as, for example, network interfaces. In instances, the bus unit may be used to establish connections to other devices as high speed graphics bus or the like. Standardized implementations of a bus unit are commonly known as SCSI, ISA, VESA, PCI, PCIe, Memory Bus and Front-Side-Bus. For this sake, a bus unit may comprise devices to adapt to the communication protocol of the external devices connected thereto as, for example driver units. The term "bus controller", as used herein refers to a physical device or a portion of another physical device configured for connecting a bus unit to a processor. A well-known exemplary implementation of a bus controller can be found in the so-called "Northbridge" device in small computer systems. In circumstances, the bus controller is integrated with the processor cores and the processor caches on the same die for better performance.

The term "main memory", as used herein, covers any kind of physical storage device connected to the processor and accessible by means of virtual or physical addressing. This may include, but not be limited to, RAM, ROM, PROM, EPROM and EEPROM devices. A "main memory" does not necessarily need to be implemented in a single device or with a single point of access. In instances, the term "main memory" may therefore relate to a number of separate portions of working memory whereby each portion has a separate connection to a processor in a multi-processor architecture.

The term "direct memory access", as used herein shall have the generalized meaning of an operational mode suitable for fetching data from any kind of a close-to-processor storage means to an I/O device without continuous involvement of a processor core. The term "close-to-processor storage means" encompasses any kind of storage means which is configured to be accessed by a processor via a bus unit by logical or physical addressing. This may include but not be limited to a portion of the processor cache(s) and the main memory. The known prior-art mode of performing direct memory access will be referred to as "conventional direct memory access" for clearer distinction.

The term "I/O device" is intended to extend to any kind of physical device making part of a computer system or being configured to be operated in connection with a computer system for the sake of input/output to/from the computer system. "Input/output" as mentioned before thereby shall have the general meaning of communication between a computer system and the outside world. "Outer world" thereby shall have the meaning of any kind of human or a technical data source or recipient, and therefore also include other computer system or even aggregates thereof as, for example, computer networks. Inputs are the signals or data received by the computer system, and outputs are the signals or data sent from it. I/O devices are therefore used to communicate with a computer system. As I/O devices may be considered, for example, keyboards, monitors, printers, network interfaces (NIC), serial/parallel port devices, external bus connectors, modems, tape drives, disk drives.

The above-described computer system architecture, data processing apparatus and operation methods may be implemented in digital electronic circuitry, in computer hardware, firmware, and/or software. The implementation may, for example, be a programmable processor, a computer, and/or multiple computers.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description of embodiments has been presented for purposes of illustration and description. It is not intended to be exhaustive or to limit embodiments of the present invention to the precise form disclosed. Modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations without leaving the scope of the underlying principle ideas.

What is claimed is:

1. A data processing apparatus comprising:
a plurality of processor cores;
a shared processor cache, the shared processor cache being connected to each of the processor cores and to a main memory, wherein in operation, the shared processor cache receives a descriptor sent by one of the processor cores regarding a transfer of requested data indicated by the descriptor from the shared processor cache to an input/output (I/O) device;
a bus controller, the bus controller being connected to the shared processor cache and receiving from the shared processor cache the descriptor sent by the one or more processor cores regarding the transfer of the requested data to trigger the bus controller to perform a data transfer according to the descriptor, wherein the descriptor is passed through the shared processor cache to the bus controller in parallel with the shared processor cache initiating prefetching the requested data from the shared processor cache or main memory by performing a direct memory access, and wherein based on receipt of the descriptor, the bus controller generates a data request to the shared processor cache to transfer the requested data to the I/O device;
a bus unit, the bus unit being connected to the bus controller and facilitating transferring data to or from the I/O device; and
wherein, by operation of the bus controller, the requested data is transferred from the shared processor cache to the bus unit for transfer to the I/O device.

2. The data processing apparatus of claim 1, wherein the shared processor cache comprises means for extracting address information within the descriptor.

3. The data processing apparatus of claim 2, wherein the shared processor cache is adapted to perform the direct memory access based on the extracted address information.

4. The data processing apparatus of claim 3, wherein the shared processor cache is adapted to perform the direct memory access based on the extracted address information and extracted information regarding a length of the requested data.

5. The data processing apparatus of claim 1, wherein the shared processor cache comprises means for extracting from the descriptor, information regarding a length of the requested data.

6. The data processing apparatus of claim 1, wherein the bus controller is configured to provide data request information to the shared processor cache in order to trigger the forwarding of the prefetched requested data to the bus controller.

7. The data processing apparatus of claim 1, wherein the shared processor cache is configured to initiate a prefetch of the requested data based on an indicator within the descriptor.

8. The data processing apparatus of claim 1, wherein the shared processor cache is configured to initiate a prefetch of the requested data based on a command type included in the descriptor.

9. The data processing apparatus of claim 1, wherein the shared processor cache is configured for loading the requested data from the main memory into the shared processor cache if the requested data is not already stored in the shared processor cache.

10. The data processing apparatus of claim 1, wherein the shared processor cache comprises an integral cache device connected to the processor cores.

11. The data processing apparatus of claim 1, wherein the shared processor cache comprises multiple integral cache devices connected together in a network, each of the integral cache devices being connected to the processor cores.

12. The data processing apparatus of claim 1, wherein the shared processor cache is part of a multi-level cache hierarchy.

13. A method for operating a data processing apparatus in connection with an input/output (I/O) device, the data processing apparatus comprising a plurality of processor cores, a shared processor cache, a bus unit, a main memory and a bus controller, the method comprising:
transmitting a descriptor from one of the processor cores to the shared processor cache in order to perform a data transfer according to the descriptor from the shared processor cache to the I/O device;
receiving the descriptor by the shared processor cache;
performing a prefetch of data to be transferred to the I/O device by the shared processor cache based on the received descriptor;
forwarding, by the shared processor cache in parallel with the performing, the descriptor to the bus controller to initiate, by the bus controller, a data request to the shared processor cache that the data be transferred from the shared processor cache to the I/O device; and
transferring the prefetched data from the shared processor cache to the I/O device via the bus unit by operation of the bus controller data request.

14. The method of claim 13, further comprising extracting, by the shared processor cache, address information within the descriptor.

15. The method of claim 14, further comprising performing, by the shared processor cache, the direct memory access based on the extracted address information.

16. The method of claim 13, further comprising initiating, by the shared processor cache, a prefetch of the requested data based on an indicator within the descriptor.

17. The method of claim 13, further comprising loading, by the shared processor cache, the requested data from the main memory into the shared processor cache if the requested data is not already stored in the shared processor cache.

18. A computer program product for operating a data processing apparatus in connection with an input/output (I/O) device, the data processing apparatus comprising a number of processor cores, a shared processor cache, a bus unit, a main memory and a bus controller, the computer program product comprising:
a computer readable storage medium having computer readable program code embodied therewith, the computer readable program code adapted to perform a method when executed comprising:
transmitting a descriptor from one of the processor cores to the shared processor cache in order to perform a data transfer according to the descriptor from the shared processor cache to the I/O device;
receiving the descriptor by the shared processor cache;
performing a prefetch of data to be transferred to the I/O device by the shared processor cache based on the received descriptor;
forwarding, by the shared processor cache in parallel with the performing, the descriptor to the bus controller to initiate, by the bus controller, a data request to the shared processor cache that the data be transferred from the shared processor cache to the I/O device; and transferring the prefetched data from the shared processor cache to the I/O device via the bus unit by operation of the bus controller data request.

\* \* \* \* \*